(12) United States Patent
Maerk

(10) Patent No.: US 8,177,190 B2
(45) Date of Patent: May 15, 2012

(54) VACUUM VALVE

(75) Inventor: Andreas Maerk, Feldkirch (AT)

(73) Assignee: VAT Holding AG, Haag (CH)

( * ) Notice: Subject to any disclaimer, the term of this patent is extended or adjusted under 35 U.S.C. 154(b) by 453 days.

(21) Appl. No.: 12/576,527

(22) Filed: Oct. 9, 2009

(65) Prior Publication Data

US 2010/0090145 A1 Apr. 15, 2010

(30) Foreign Application Priority Data

Oct. 15, 2008 (DE) .................. 10 2008 051 349

(51) Int. Cl.
*F16K 31/122* (2006.01)
(52) U.S. Cl. ......... 251/158; 251/175; 251/187; 251/193
(58) Field of Classification Search .................. 251/158, 251/175, 187, 193, 326–329
See application file for complete search history.

(56) References Cited

U.S. PATENT DOCUMENTS

| | | | |
|---|---|---|---|
| 5,577,707 A | 11/1996 | Brida | |
| 5,755,255 A * | 5/1998 | Iwabuchi | 137/341 |
| 5,975,492 A * | 11/1999 | Brenes | 251/175 |
| 6,056,266 A | 5/2000 | Blecha | |
| 6,416,037 B1 | 7/2002 | Geiser | |
| 6,425,569 B1 * | 7/2002 | Ito | 251/158 |
| 6,427,973 B1 * | 8/2002 | Wagner | 251/175 |
| 6,431,518 B1 | 8/2002 | Geiser | |
| 6,454,241 B2 * | 9/2002 | Tamura et al. | 251/193 |
| 6,471,181 B2 * | 10/2002 | Duelli | 251/85 |
| 6,561,483 B2 | 5/2003 | Nakagawa | |
| 6,776,394 B2 | 8/2004 | Lucas | |
| 6,899,316 B2 | 5/2005 | Duelli | |
| 7,134,642 B2 * | 11/2006 | Seitz | 251/193 |
| 7,270,311 B1 * | 9/2007 | Brenes | 251/175 |
| 7,413,162 B2 | 8/2008 | Geiser | |
| 2006/0011140 A1 * | 1/2006 | Blahnik et al. | 118/733 |
| 2007/0257220 A1 * | 11/2007 | Litscher et al. | 251/62 |
| 2007/0272888 A1 | 11/2007 | Tichy | |
| 2007/0290157 A1 | 12/2007 | Schoen | |
| 2008/0017822 A1 | 1/2008 | Schoen et al. | |

\* cited by examiner

*Primary Examiner* — John Bastianelli
(74) *Attorney, Agent, or Firm* — Frommer Lawrence & Haug LLP

(57) ABSTRACT

A vacuum valve including a valve body with a valve orifice, a closure member for closing the valve orifice, a first piston-cylinder unit, a second piston-cylinder unit, a first control element, and a second control element. When opening the vacuum valve, a pressure medium line, which applies pressure to the opening cylinder space of the second piston-cylinder unit, is blocked during the first part of the opening process, and is released at the end of the first part of the opening process by the first control element. When closing the vacuum valve, a pressure medium line, which applies pressure to the closing cylinder space of the first piston-cylinder unit, is blocked during the first part of the closing process, and is released by the second control element at the end of the first part of the closing process.

9 Claims, 3 Drawing Sheets

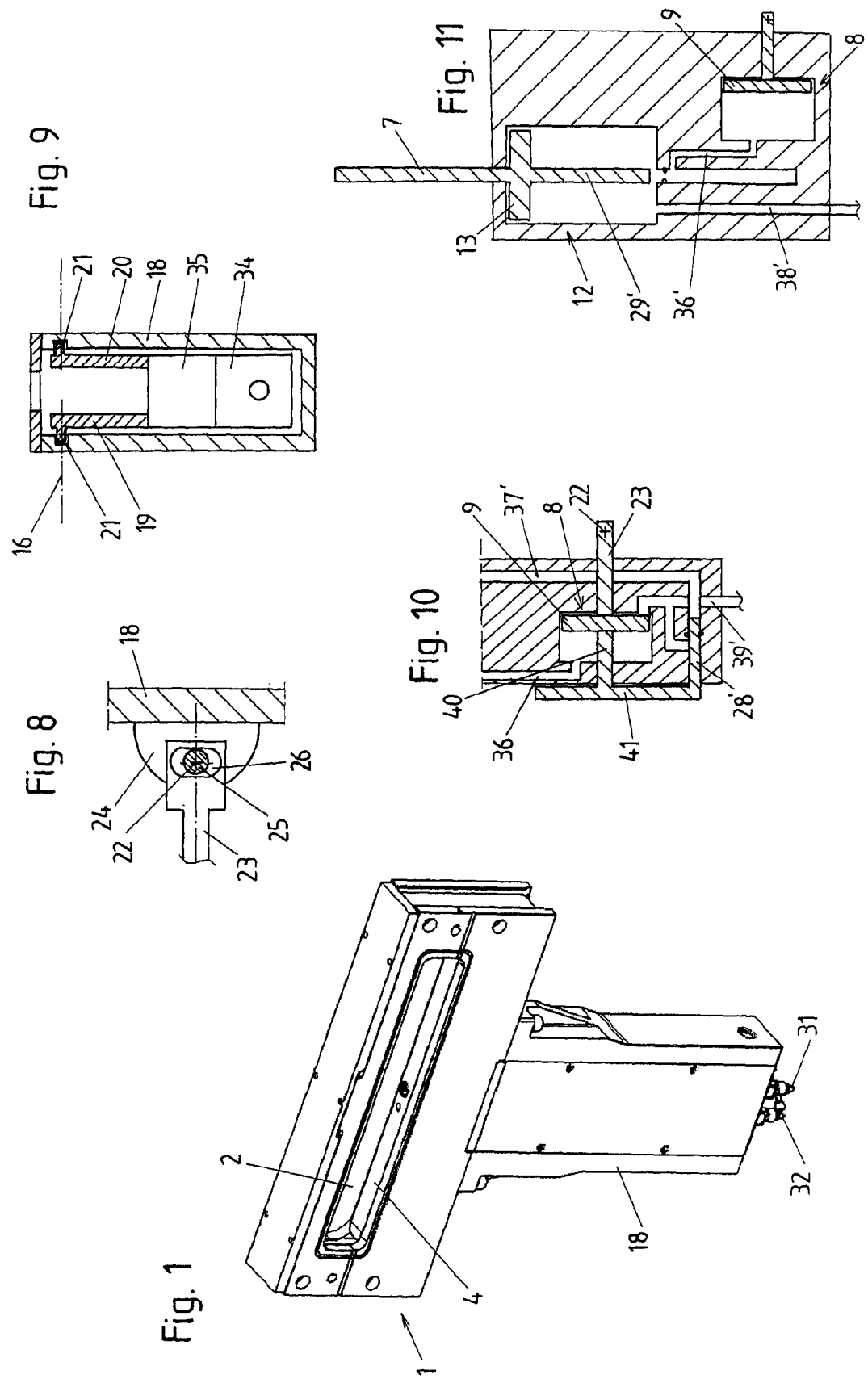

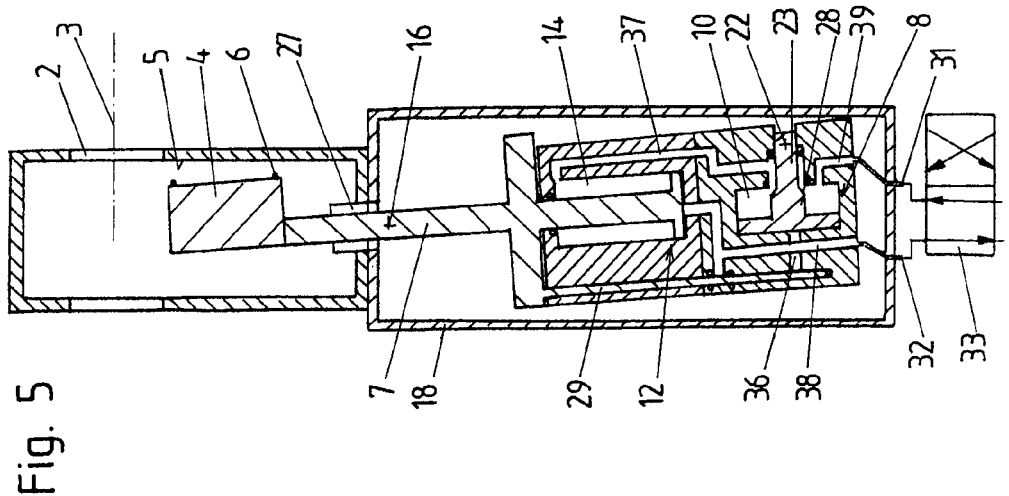
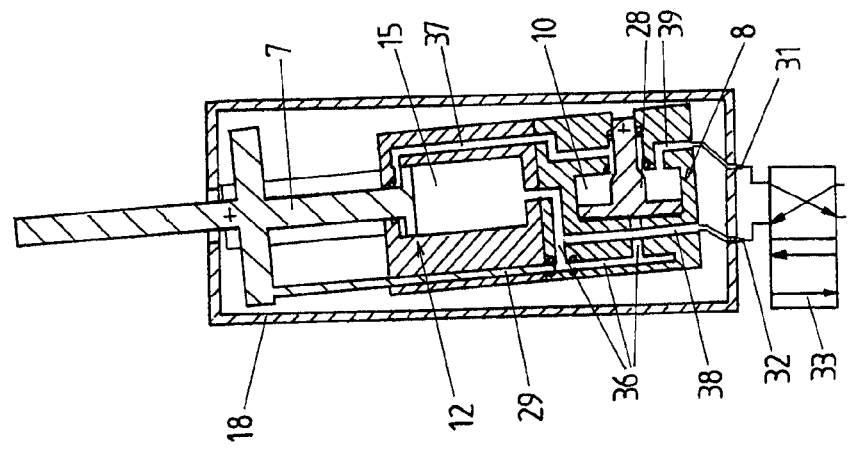
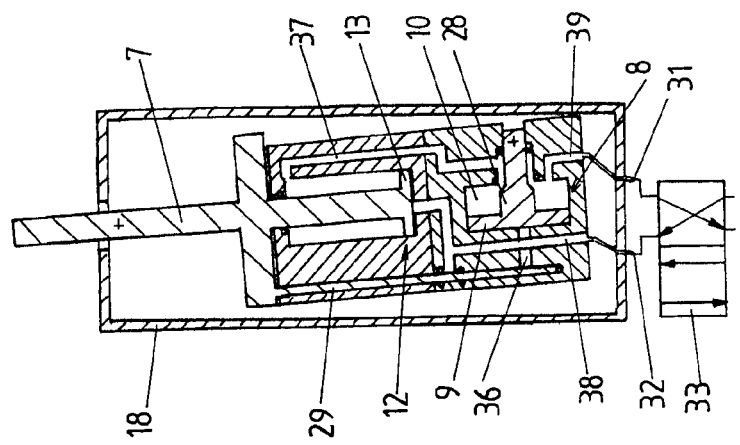

VACUUM VALVE

The present application claims priority from German Patent Application No. DE 10 2008 051 349.0 filed on Oct. 15, 2008, the disclosure of which is incorporated herein by reference in its entirety.

BACKGROUND OF THE INVENTION

1. Field of the Invention

The invention is directed to a vacuum valve comprising a valve body with a valve orifice, at least one closure member for closing the valve orifice, a first piston-cylinder unit having an opening cylinder space and a closing cylinder space, wherein pressure is applied to the opening cylinder space of the first piston-cylinder unit by a pressure medium over the course of a first part of the opening process when opening the vacuum valve and pressure is applied to the closing cylinder space of the first piston-cylinder unit by a pressure medium over the course of a second part of the closing process when closing the vacuum valve, and a second piston-cylinder unit having an opening cylinder space and a closing cylinder space, wherein pressure is applied to the opening cylinder space of the second piston-cylinder unit by a pressure medium over the course of a second part of the opening process when opening the vacuum valve and pressure is applied to the closing cylinder space of the second piston-cylinder unit by a pressure medium over the course of a first part of the closing process when closing the vacuum valve.

2. Description of Related Art

There are various known constructions of vacuum valves in which opening and closing are carried out in two phases in which different actuators are activated.

For example, L-valves are known in which a valve plate is pressed against a valve seat surrounding the valve orifice in the closed state of the vacuum valve. To open the vacuum valve, the valve plate is displaced from this closed position into an intermediate position in which it is lifted from the valve seat but covers the valve orifice and is further displaced into an open position in which it releases the valve orifice. The displacement from the intermediate position to the open position is carried out in a straight line in a direction at right angles to the axis of the valve orifice. The closing of the valve is carried out in the reverse sequence. When the valve plate runs against the valve seat at an inclination to the axis of the valve orifice, the term "J-valve" is also used.

Aside from L-valves and J-valves in which the movement of the valve plate from its closed position to its intermediate position and from its intermediate position to its open position is carried out by means of separate piston-cylinder units, there are also known L-valves and J-valves diverging from the generic type in which a slot guide is provided in order to tilt a valve rod supporting the valve plate around a swiveling axis and, accordingly, to adjust the valve plate between its intermediate position and its closed position, wherein the valve drive has only one individual piston-cylinder unit.

L-valves with separate piston-cylinder units for moving the valve plate from its closed position into its intermediate position and from its intermediate position into its open position are known, for example, from U.S. Pat. Nos. 6,431,518 B1, 6,416,037 B1, 6,056,266 B, US 2008/0017822 A1, U.S. Pat. No. 6,899,316 B2, and 6,561,483 B2.

The pendulum valve is another type of vacuum valve in which the opening and closing process is also carried out in two steps. When the vacuum valve is opened, the valve plate, after having been moved in axial direction of the valve orifice from its closed position into its intermediate position, is moved along an arc into its open position in which it releases the valve orifice. To this end, the valve plate is arranged at a carrying arm which is fastened to a shaft which is rotatable about its axis and displaceable in its longitudinal direction. In addition to embodiment forms diverging from the generic type in which only one actuator is provided for rotating the shaft and for the axial displacement of the shaft (e.g., U.S. Pat. No. 6,776,394 B2), other embodiment forms are known which provide different actuators for this purpose (e.g., in U.S. Pat. No. 7,413,162 B or US 2007/02 901 57 A1). In this connection, a piston-cylinder unit which is integrated in the valve plate can be provided for axial displacement. A rotary drive is used for rotation around the longitudinal axis of the shaft. A rotary drive of this kind could also be constructed with a piston-cylinder unit as actuator.

Another vacuum valve in which the opening and closing is carried out in two steps is disclosed by U.S. Pat. No. 5,577,707. To close the vacuum valve, a valve plate is displaced in a first step from a position in which the valve orifice is released into a position in which the valve orifice is covered. In the second step, a sliding ring which is mounted so as to be displaceable in a sealed manner relative to the valve body is displaced in axial direction of the valve orifice and tightly pressed against the valve plate. The opening process is carried out in reverse of the closing process. A servomotor is provided as an actuator for displacing the valve plate, and a piston-cylinder unit is provided for displacing the sliding ring.

In order to carry out the movements in the proper sequence in valve valves in which the opening and closing take place in two steps with separate actuators, particularly piston-cylinder units, provided for the two steps, position sensors can be provided which acquire the position of the valve plate or of a part that is moved along with the movement of the valve plate. The outputs of these position sensors are then evaluated by an external control device for driving the control valves actuating the piston-cylinder units in the desired manner.

In the vacuum valve known from U.S. Pat. No. 6,431,518 B1, the correct sequence of movements when opening the vacuum valve is carried out by means of a first control element which is moved along with the first piston-cylinder unit driving the movement of the valve plate from its closed position into its intermediate position. Toward the end of the movement of the piston, this piston opens a pressure line through which pressure medium can subsequently escape from the closing cylinder space of the second piston-cylinder unit. The pressure in the opening cylinder space of the second piston-cylinder unit can subsequently displace the piston of the second piston-cylinder unit in order to move the valve plate from its intermediate position into its open position. When closing the vacuum valve, pressure is applied to the closing cylinder space of the second piston-cylinder unit, and its opening cylinder space is vented, wherein there is a connection line to the opening cylinder space of the first piston-cylinder unit in order to generate a dynamic pressure. This prevents a movement of the piston of the first piston-cylinder unit which is loaded in the closing direction from the start of the closing of the vacuum valve until the movement of the piston of the second piston-cylinder unit is terminated. This vacuum valve makes do without position sensors for the parts which are moved during opening and closing, and a correct sequence of movements is achieved in normal operation. Under special operating conditions, for example, unaccustomed network pressures or when building up pressure after a pressureless state, there may be a risk of unwanted movements owing to the control by means of differential pressure or dynamic pressures.

U.S. Pat. No. 6,056,266 B and US 2007/02 72 888 A1 disclose controlling of the movement sequence of L-valves with separate piston-cylinder units for the two movement steps through differential pressures exclusively. When valves of this kind are out of operation for longer periods of time, malfunctioning may occur due to an increased friction coefficient for the first movement of the piston (slip-stick).

SUMMARY OF THE INVENTION

It is the object of the invention to provide a vacuum valve of the type mentioned in the beginning which is highly reliable with respect to the sequence of movements without requiring for this purpose position sensors for the parts of the valve that are moved during opening and closing. According to the invention, this object is met by means of a vacuum valve comprising a valve body with a valve orifice, at least one closure member for closing the valve orifice, a first piston-cylinder unit having an opening cylinder space and a closing cylinder space, wherein pressure is applied to the opening cylinder space of the first piston-cylinder unit by a pressure medium over the course of a first part of the opening process when opening the vacuum valve and pressure is applied to the closing cylinder space of the first piston-cylinder unit by a pressure medium over the course of a second part of the closing process when closing the vacuum valve, and a second piston-cylinder unit having an opening cylinder space and a closing cylinder space, wherein pressure is applied to the opening cylinder space of the second piston-cylinder unit by a pressure medium over the course of a second part of the opening process when opening the vacuum valve and pressure is applied to the closing cylinder space of the second piston-cylinder unit by a pressure medium over the course of a first part of the closing process when closing the vacuum valve, wherein the vacuum valve has a first control element for controlling the application of pressure to the opening cylinder space of the second piston-cylinder unit, which first control element is moved along with the piston of the first piston-cylinder unit, and a second control element for controlling the application of pressure to the closing cylinder space of the first piston-cylinder unit, which second control element is moved along with a piston of the second piston-cylinder unit, wherein a pressure medium line for the application of pressure to the opening cylinder space of the second piston-cylinder unit is blocked during the opening of the vacuum valve over the course of the first part of the opening process, and the pressure medium line for the application of pressure to the opening cylinder space of the second piston-cylinder unit is released at the end of the first part of the opening process by the first control element, and wherein a pressure medium line for the application of pressure to the closing cylinder space of the first piston-cylinder unit is blocked during the closing of the vacuum valve over the course of the first part of the closing process, and the pressure medium line for the application of pressure to the closing cylinder space of the first piston-cylinder unit is released by the second control element at the end of the first part of the closing process.

A vacuum valve according to the invention has a first control element for controlling the application of pressure to the opening cylinder space of the second piston-cylinder unit, which first control element is moved along with the piston of the first piston-cylinder unit, and a second control element for controlling the application of pressure to the closing cylinder space of the first piston-cylinder unit, which second control element is moved along with the piston of the second piston-cylinder unit. A pressure medium line by which the pressure medium is supplied to the opening cylinder space of the second piston-cylinder unit is blocked during the opening of the vacuum valve over the course of the first part of the opening process (i.e., the opening cylinder space of the second piston-cylinder unit is not acted upon by the pressure of the pressure medium). At the end of the first part of the opening process, this pressure medium line is released by the first control element by means of the displacement of the first control element during the movement of the piston of the first piston-cylinder unit so that the opening cylinder space of the second piston-cylinder unit is subsequently acted upon by the pressure of the pressure medium. When closing the vacuum valve, a pressure medium line serving to supply the pressure medium to the closing cylinder space of the first piston-cylinder unit is blocked over the course of the first part of the closing process (i.e., the closing cylinder space of the first piston-cylinder unit is not acted upon by the pressure of the pressure medium). At the end of the first part of the closing process, this pressure medium line is released by the second control element by means of the displacement of the second control element during the movement of the piston of the second piston-cylinder unit so that the closing cylinder space of the first piston-cylinder unit is subsequently acted upon by the pressure of the pressure medium.

In a vacuum valve constructed according to the invention, a dependable controlling of the opening and closing process can be achieved in a simple and inexpensive construction of the vacuum valve.

The first control element and second control element, respectively, can be moved along with the piston of the respective piston-cylinder unit by means of a suitable mechanical coupling with the piston of the respective piston-cylinder unit, for example, by fastening the control element to the piston, forming the control element on, or fastening it to, the piston rod or on or to a part connected to the piston rod.

When opening the vacuum valve, the closing cylinder space of the first piston-cylinder unit is advantageously connected to atmospheric pressure (i.e., switched to no pressure) at least over the course of the first part of the opening process, and the closing cylinder space of the second piston-cylinder unit is connected to atmospheric pressure (i.e., switched to no pressure) at least over the course of the second part of the opening process. When closing the vacuum valve, the opening cylinder space of the second piston-cylinder unit is advantageously connected to atmospheric pressure (i.e., switched to no pressure) at least over the course of the first part of the closing process, and the opening cylinder space of the first piston-cylinder unit is advantageously connected to atmospheric pressure (i.e., switched to no pressure) at least over the course of the second part of the closing process. Accordingly, in an advantageous manner in a vacuum valve according to the invention, the piston of the first piston-cylinder unit is not acted upon on both sides in any phase of opening or in any phase of closing, and the piston of the second piston-cylinder unit is not acted upon on both sides in any phase of opening or in any phase of closing.

In the closed state of the vacuum valve, the valve plate covers the valve orifice and is sealed relative to the valve body. In a preferred embodiment form, the valve plate is pressed against a valve seat surrounding the valve orifice and is sealed relative to the valve seat by means of a seal. The seal is preferably arranged at the valve plate and is pressed against a sealing surface forming the valve seat. It is also conceivable and possible to arrange the seal at the valve seat and to arrange the sealing surface at the valve plate. In another embodiment form, the sealing of the valve plate relative to the valve body can be carried out by means of a sliding ring which is supported so as to be displaceable relative to the valve body and is sealed relative to the valve body and is pressed against the valve plate in the closed state of the vacuum valve and sealed relative to the valve plate by means of a seal.

In the open state of the vacuum valve, the valve plate releases the valve orifice. In so doing, it preferably extends entirely to the side of the valve orifice viewed in axial direction of the valve orifice.

In an advantageous embodiment form of the invention, the valve plate is moved in the first part of the opening process of the first piston-cylinder unit from a closed position, in which it is pressed against the valve seat surrounding the valve orifice and seals the valve orifice, into an intermediate position in which it is lifted from the valve seat and, in the second part of the opening process of the second piston-cylinder unit, the valve plate is moved from the intermediate position into an open position in which it releases the valve orifice. Accordingly, the valve plate is moved along an opening path whose first part extends parallel to the axis of the valve orifice or at least at an angle of less than 90°, preferably less than 60°, to the axis of the valve orifice from the closed position of the valve plate into the intermediate position of the valve plate. The second portion of the opening path from the intermediate position to the open position of the valve plate can extend in a straight line and at right angles to the axis of the valve orifice in a possible constructional variant when the vacuum valve is constructed as an L-valve or J-valve. In another constructional variant when the vacuum valve is constructed as a pendulum valve, the second portion of the opening path can extend from the intermediate position to the open position along an arc.

The closing process is carried out in reverse to the opening process, that is, in the first part of the closing process the valve plate moves from its open position into its intermediate position and in the second part of the closing process from its intermediate position into its closed position (i.e., the first portion of the closing path of the valve plate corresponds to the second portion of the opening path in the opposite direction, and the second portion of the closing path corresponds to the first portion of the opening path in the opposite direction).

BRIEF DESCRIPTION OF THE DRAWINGS

FIG. 1 shows an oblique view of an embodiment example of a vacuum valve according to the invention;

FIGS. 2 to 7 show simplified, schematic cross sections through the vacuum valve in the opened state (FIG. 2), at the start of opening (FIG. 3), after the first part of the opening process (FIG. 4), in the opened state (FIG. 5), at the start of closing (FIG. 6), and after the first part of the closing process (FIG. 7); for the sake of simplicity, only the valve drive with the valve rod is shown in FIGS. 3, 6 and 7;

FIG. 8 shows a schematic, enlarged view in the area where the piston rod of the first piston-cylinder unit is connected to the drive housing;

FIG. 9 shows a schematic sectional view (section plane at right angles to the section plane of FIGS. 2 to 7 and at right angles to the axis of the valve orifice) of the drive block and drive housing;

FIG. 10 shows a schematic view of another possible constructional variant of the first control element; and FIG. 11 shows a schematic view of another possible constructional variant of the second control element.

DETAILED DESCRIPTION OF EMBODIMENTS

Figure 4:
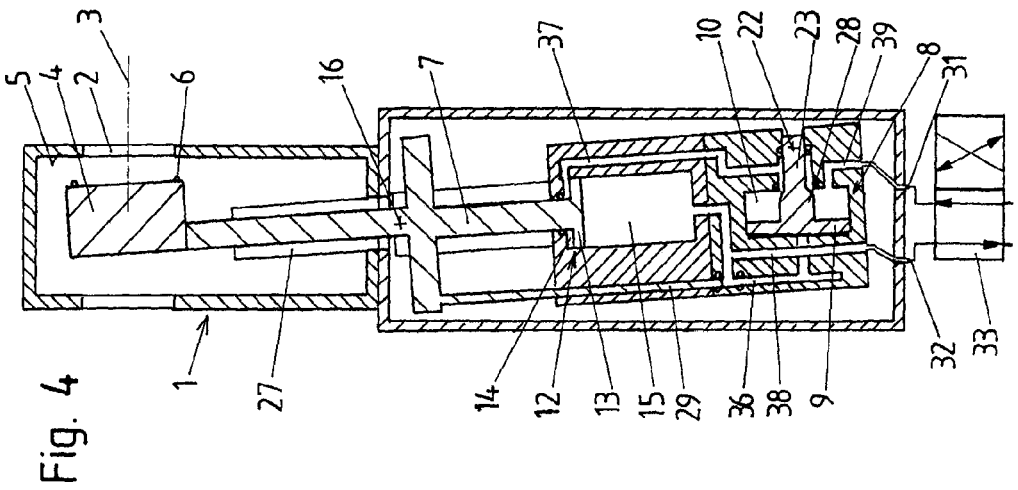

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

An embodiment example of a vacuum valve according to the invention will be described in the following with reference to FIGS. 1 to 9. The vacuum valve comprises a valve body 1 which is constructed in the manner of a housing and which has a valve orifice 2 with an axis 3. The closure member of the vacuum valve is formed by a valve plate 4 which is pressed against a valve seat 5 surrounding the valve orifice 2 in the closed state of the vacuum valve and closes the valve orifice 2 in a vacuum-tight manner. To this end, an annular seal 6 made of an elastic material is arranged at the valve plate 4 and is pressed against the valve seat 5 which has a sealing surface. In this closed state of the vacuum valve (FIG. 2), the valve plate 4 occupies a closed position.

In the open state of the vacuum valve (FIG. 5), the valve orifice 2 is released by the valve plate 4. In its open position, which it occupies in the opened state of the vacuum valve, the valve plate 4 preferably extends entirely to the side of the valve orifice 2 considered in axial direction of the valve orifice 2.

In the embodiment example, the vacuum valve is constructed as an L-valve. In this case, when the vacuum valve is opened, the valve plate 4 is initially displaced in a first part of the opening process from its closed position into an intermediate position in which it is lifted from the valve seat 5 but still covers the valve orifice 2 considered in axial direction of the valve orifice 2. Accordingly, the displacement of the valve plate 4 from its closed position into its intermediate position is advantageously carried out at least approximately in direction of the axis 3 of the valve orifice 2 (the deviation from the axial direction is preferably less than 20°).

In a second part of the opening process, the valve plate 4 is displaced from its intermediate position, shown in FIG. 4, into its open position shown in FIG. 5. This displacement is advantageously carried out at least approximately at right angles to the axis 3 of the valve orifice 2 (the deviation from the right angle to the axis 3 is preferably less than 10°).

Figure 2:
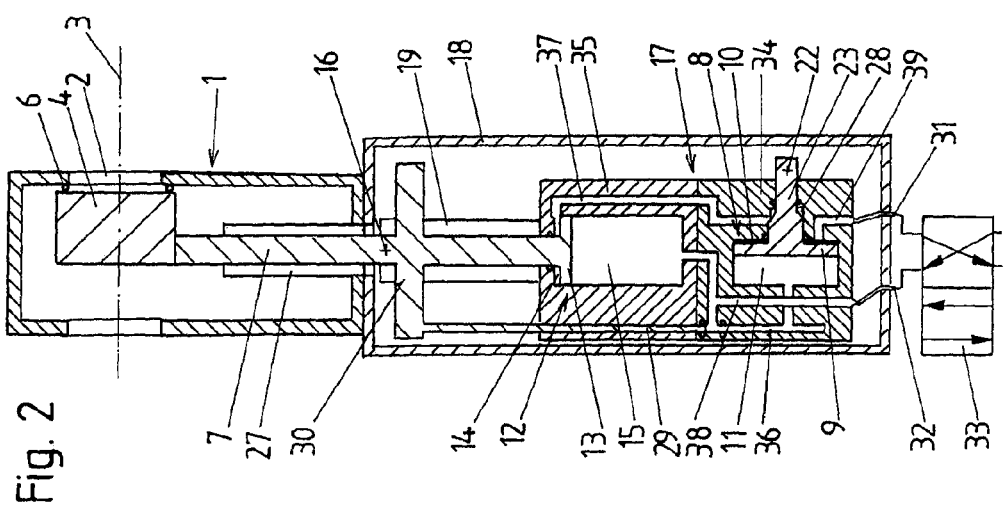

Closing is carried out in the reverse manner. In the first part of the closing process, the valve plate 4 is displaced from its open position (FIG. 6) into its intermediate position (FIG. 7) and, in the second part of the closing process, from its intermediate position (FIG. 7) into its closed position (FIG. 2). The movement directions are the reverse of those during opening.

In the first part of the opening process, the valve plate moves along a first segment of its opening path, in the second part of the opening process it moves along a second segment of its opening path, in the first part of the closing process it moves along a first segment of its closing path, and in the second part of the closing process it moves along a second segment of its closing path.

The valve plate 4 is arranged at a valve rod 7 which is displaced by means of a valve drive comprising the first and second piston-cylinder units 8, 12 to open and close the vacuum valve. When opening the vacuum valve, the valve plate 4 is displaced by means of the first piston-cylinder unit 8 from its closed position into its intermediate position, and when closing the vacuum valve the valve plate 4 is displaced from its intermediate position into its closed position. To this end, the valve rod 7 in the present embodiment example is swiveled around the swiveling axis 16 which extends at right angles to the valve rod 7 and at right angles to the axis 3 of the valve orifice 2.

The valve plate 4 is displaced by means of the second piston-cylinder unit 12 from its intermediate position into its open position when opening the vacuum valve and from its open position into its intermediate position when closing the vacuum valve. The valve rod 7 is displaced in its axial direction.

A drive block 17 of the valve drive having the first and second piston-cylinder units 8, 12 is mounted so as to be swivelable relative to a drive housing 18 of the valve drive to form the swiveling axis 16. For example, bearing arms 19, 20 of the drive block 17 can be provided for this purpose. The bearing arms 19, 20 are rotatably supported by means of swivel pins 21 in swivel bushings of the drive housing 18.

In the present embodiment example, for axial displacement of the valve rod 7 by means of the second piston-cylinder unit 12, the valve rod 7 is fastened directly to the piston 13 of the second piston-cylinder unit 12 (i.e., the valve rod 7 is formed by the piston rod of the second piston-cylinder unit 12). Instead of this, the second piston-cylinder unit 12, for example, could also have a separate piston rod which is mechanically connected to the valve rod 7.

For the swiveling of the drive block 17 by means of the first piston-cylinder unit 8, the piston rod 23 of the first piston-cylinder unit 8 is connected to the drive housing 18 so as to be swivelable around the swiveling axis 22. For this purpose, for example, as is shown schematically in FIG. 8, a connection pin 25 which is arranged at a connection lug 24 fastened to the drive housing 18 can project into a recess 26 in the end area of the piston rod 23. The recess 26 is formed as an elongated hole extending at right angles to the longitudinal axis of the piston rod 23 to enable a displacement of the piston rod 23 in this direction when the drive block 17 swivels around the swiveling axis 16.

Instead of a swiveling of the valve rod 7 around the swiveling axis 16 in the first part of the opening process and in the second part of the closing process, a parallel displacement of the valve rod 7 in direction of the axis 3 of the valve orifice 2 or at least in a direction extending approximately parallel to the axis 3, preferably enclosing an angle of less than 20° with the axis 3, could be provided. A configuration of this kind is likewise already known from the prior art cited in the beginning. To this end, the drive block 17, for example, could be supported so as to be displaceable relative to the drive housing 18 in the manner of a slide.

The valve rod 7 is guided out of a vacuum area of the vacuum valve. For this purpose, bellows 27 (e.g., diaphragm bellows or bag bellows) are provided in the present embodiment example.

The pistons 9, 13 are displaceably supported in recesses of cylinder blocks 34, 35 which form the cylinder spaces 10, 11, 14, 15. Instead of this, separate cylinders could also be provided for receiving pistons 9, 13.

A first control element 28 which moves along with the piston 9 of the first piston-cylinder unit 8 and a second control element 29 which moves along with the piston 13 of the second piston-cylinder unit 12 serve to control the movement sequence of the first and second piston-cylinder unit 8, 12 during the opening and closing of the vacuum valve. In the embodiment example shown in FIGS. 1 to 9, the first control element 28 is formed at the piston rod 23. It is formed by a portion of the piston rod 23 adjoining the piston 9 having a greater diameter than another portion of the piston rod 23 situated farther away from the piston 9. The second control element 29 is formed by a control rod which is arranged at a flange 30 fastened to the valve rod 7.

Compressed air preferably serves as the pressure medium for opening and closing the vacuum valve. With this in mind, the opening and closing of the vacuum valve is described in the following. A hydraulic embodiment is conceivable and possible in principle but is less preferable.

Figure 3:
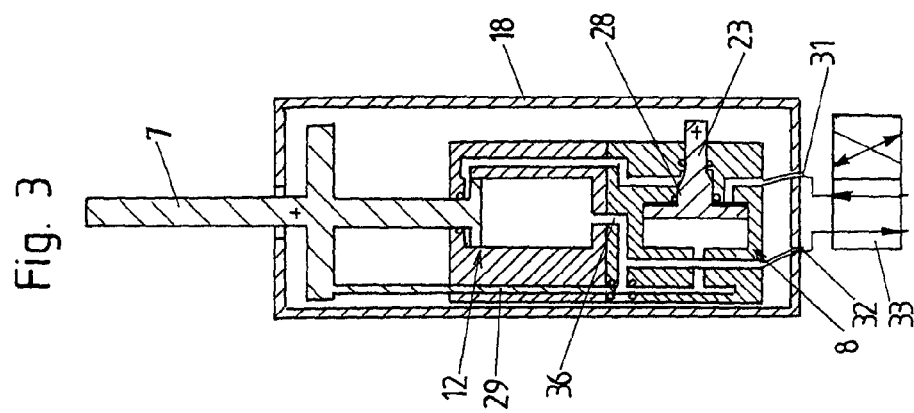

To open the vacuum valve proceeding from its closed state shown in FIG. 2, an opening connection 31 of the valve drive is acted upon by pressure medium and a closing connection 32 is connected to atmospheric pressure (i.e., vented). For this purpose, for example, a 4/2-way directional valve can be switched from the position shown in FIG. 2 to the position shown in FIG. 3. FIG. 3 shows the state immediately after switching but still without movement of the pistons 9, 13 of the piston-cylinder units 8, 12.

The pressure medium is supplied to an opening cylinder space 10 of the first piston-cylinder unit 8 via a pressure medium line 39. The closing cylinder space 11 of the first piston-cylinder unit is connected to the closing connection 32 and, therefore, to atmospheric pressure so as to be vented via a pressure medium line 36 which connects the closing cylinder space 11 of the first piston-cylinder unit 8 to the closing cylinder space 15 of the second piston-cylinder unit 12 and via a pressure medium line 38 which branches off from it. A connection between the opening cylinder space 10 of the first piston-cylinder unit 8 and the opening cylinder space 14 of the second piston-cylinder unit 12 by means of this connecting pressure medium line 37 is initially blocked by the first control element 28. The closing cylinder space 15 of the second piston-cylinder unit 12 is connected to the closing connection 32 (i.e., to atmospheric pressure so as to be vented) by a portion of the pressure medium line 36 adjoining the closing cylinder space 15 and by the pressure medium line 38.

The piston 9 of the first piston-cylinder unit 8 is now displaced by the pressure medium from its position shown in FIG. 3 so that the valve plate 4 is displaced in the direction of its intermediate position until, at the end of the first part of the opening process, the first control element 28 releases the connection between the opening cylinder space 10 of the first piston-cylinder unit 8 and the opening cylinder space 14 of the second piston-cylinder unit 12 via the pressure medium line 37 (see FIG. 4). This is followed by the second part of the opening process, over the course of which the opening cylinder space 14 of the second piston-cylinder unit 12 is also acted upon by pressure medium and the piston 13 of the second piston-cylinder unit is displaced, the valve plate 4 being displaced in the direction of its open position. The opened state shown in FIG. 5 is reached at the end of the second part of the opening process.

To close the vacuum valve proceeding from the opened state (FIG. 5), pressure medium is applied to the closing connection 32 and the opening connection 31 is connected to atmospheric pressure, for example, by switching a 4/2-way directional valve 33. FIG. 6 shows the state immediately after switching before the pistons 9, 13 of the piston-cylinder units 8, 12 have moved. Pressure medium is applied to the closing cylinder space 15 of the second piston-cylinder unit 12 via the pressure medium line 38 and the portion of the pressure medium line 36 which adjoins the inlet opening of the pressure medium line 38 and which leads to the closing cylinder space 15. However, the second control element 29 blocks the portion of the pressure medium line 36 extending between the inlet opening of the pressure medium line 38 and the closing cylinder space 11 of the first piston-cylinder unit 8. The closing cylinder space 11 of the first piston-cylinder unit 8 is accordingly not acted upon by pressure medium over the course of the first part of the closing process. The connection of the opening cylinder space 14 of the second piston-cylinder unit 12 to the opening cylinder space 10 of the first piston-cylinder unit 8 via the pressure medium line 37 is released by the first control element 28. The opening cylinder spaces 14, 10 of the piston-cylinder units 12, 8 are accordingly connected to atmospheric pressure by the pressure medium line 39 extending between the opening cylinder space 10 of the first piston-cylinder unit and the opening connection 31.

The piston 13 of the second piston-cylinder unit 12 is now displaced from its position shown in FIG. 6 by the pressure medium and, along with it, the valve plate 4 is displaced from its open position in the direction of its intermediate position. At the end of the stroke of the piston 13 of the second piston-cylinder unit 12, the second control element 29 releases the connection between the closing cylinder space 15 of the second piston-cylinder unit 12 and the closing cylinder space 11 of the first piston-cylinder unit 8 via the pressure medium line 36 so that pressure medium is applied to the closing cylinder space 11 of the first piston-cylinder unit 8. There follows the second part of the closing process in which the stroke of the piston 9 of the first piston-cylinder unit 8 is carried out until the closing position shown in FIG. 2 is reached.

Before the movement of the piston 9 of the first piston-cylinder unit 8 has been concluded at the start of the second part of the opening process after the pressure feed to the opening cylinder space 14 of the second piston-cylinder unit 12 has been released by the first control element 28, the pistons 9, 13 of the two piston-cylinder units 8, 12 can move simultaneously over a first portion of the second part of the opening process. Before the movement of the piston 13 of the second piston-cylinder unit 12 has been concluded at the start of the second part of the closing process after the pressure feed to the closing cylinder space 11 of the first piston-cylinder unit 8 has been released by the second control element 29, the pistons 9, 13 of the two piston-cylinder units 8, 12 can move simultaneously over a first portion of the second part of the closing process.

When the supply of pressure medium is canceled in the closed state of the vacuum valve and both connections 31, 32 are accordingly at atmospheric pressure, the piston 13 of the second piston-cylinder unit 12 remains in the position shown in FIG. 2 because of the blocking of the connection between the opening cylinder space 14 of the second piston-cylinder unit 12 and the opening cylinder space 10 of the first piston-cylinder unit 8 by the first control element 28 as long as the piston 9 has not yet been displaced for releasing the first control element 28. This applies in an analogous manner to the piston 9 of the first piston-cylinder unit 8 which remains in its position shown in FIG. 5 when the supply of pressure medium is canceled in the open state of the vacuum valve and the piston 13 is not displaced until the control element 29 releases the connection between the closing cylinder space of the second piston-cylinder unit 12 and the closing cylinder space 11 of the first piston-cylinder unit 8.

Spring elements can be provided for the pistons 9 and/or 13 to pre-load the pistons 9 and 13, respectively, in a desired position without pressure medium being applied.

Examples for possible modified embodiment forms of the first control element and second control element are shown schematically in FIGS. 10 and 11. In the constructional variant shown in FIG. 10, a second piston rod 40 is arranged at the piston 9 of the first piston-cylinder unit 8. The rod-shaped first control element 28' is arranged at a flange 41 which is arranged at the second piston rod 40. In the position of the piston 9 corresponding to the closed position of the valve plate 4, the first control element 28' blocks the connection between the opening cylinder space 10 of the first piston-cylinder unit 8 and the opening cylinder space 14 of the second piston-cylinder unit 12 via the pressure medium line 37' and therefore blocks the supply of pressure to the opening cylinder space 14 of the second piston-cylinder unit. The pressure medium line 39' connects the opening cylinder space 10 of the first piston-cylinder unit to the opening connection 31.

In the constructional variant shown schematically in FIG. 11, a control rod forming the second control element 29' is arranged at the piston 13 of the second piston-cylinder unit. In the position of the piston 13 corresponding to the open position of the valve plate 4, this control rod blocks the connection between the closing cylinder space 15 of the second piston-cylinder unit 12 and the closing cylinder space 12 of the first piston-cylinder unit 8 via the pressure medium line 36' and therefore blocks the supply of pressure to the closing cylinder space 11 of the first piston-cylinder unit 8. The pressure medium line 38' connects the closing cylinder space 15 of the second piston-cylinder unit 12 to the closing connection 32.

The invention can be used in an analogous manner in other types of vacuum valves in which opening and closing is carried out in two steps by means of first and second piston-cylinder units (e.g., in other types of L-valves and J-valves in which separate piston-cylinder units are provided for the two steps of the opening process and closing process and such as are known from the prior art cited in the introductory part of the specification).

The invention can also be used in pendulum valves such as are known, for example, from the prior art cited in the introductory part of the specification when piston-cylinder units are used as actuators for the rotary drive and for the displacement of the valve plate from its intermediate position into its closing position which is preferably carried out parallel to the axis of the valve orifice or at an angle of less than 30° relative to it.

Also, the invention can be used, for example, in a valve in which the valve plate is displaced in a first step from a position in which the valve orifice is released into a position in which the valve orifice is covered and in which a sliding ring which is supported so as to be displaceable relative to the valve body is displaced in axial direction of the valve orifice in the second step and adjusted against the valve plate in a sealing manner as disclosed, for example, in the prior art cited in the introductory part of the specification when the drive for displacing the valve plate and the drive for displacing the sliding ring both have a piston-cylinder unit as actuator.

It is conceivable and possible to use two or more first piston-cylinder units which are controlled in parallel and/or two or more second piston-cylinder units which are controlled in parallel. For example, the vacuum valve could have two or more valve rods, each of which is driven by a second piston-cylinder unit.

Further, it is conceivable and possible that the vacuum valve has two or more valve plates which are fastened to a valve rod or to more than one valve rod.

The valve orifice can also be provided in the wall of a vacuum chamber, in which case this wall forms the valve body.

A vacuum valve according to the invention can also be provided for a differential pressure acting in only one direction. Such closure devices are known as "gates". The valve plate can also be arranged outside the vacuum area, for example, at the outer side of a vacuum chamber.

As follows from the preceding description, the scope of the invention is not limited to the embodiment examples shown herein, but rather should be defined with reference to the appended claims together with their full range of possible equivalents.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 1 valve body
2 valve orifice
3 axis
4 valve plate
5 valve seat
6 seal
7 valve rod
8 first piston-cylinder unit
9 piston
10 opening cylinder space
11 closing cylinder space
12 second piston-cylinder unit
13 piston
14 opening cylinder space
15 closing cylinder space
16 swiveling axis
17 drive block
18 drive housing
19 bearing arm
20 bearing arm
21 swivel pin
22 swiveling axis
23 piston rod
24 connection lug
25 connection pin
26 recess
27 bellows
28, 28' first control element
29, 29' second control element
30 flange
31 opening connection
32 closing connection
33 4/2-way directional valve
34 first cylinder block
35 second cylinder block
36, 36' pressure medium line
37, 37' pressure medium line
38, 38' pressure medium line
39, 39' pressure medium line
40 piston rod
41 flange

What is claimed is:

1. A vacuum valve comprising:
a valve body with a valve orifice;
at least one closure member for closing the valve orifice;
a first piston-cylinder unit having an opening cylinder space and a closing cylinder space; and
a second piston-cylinder unit having an opening cylinder space and a closing cylinder space;
a first control element for controlling the application of pressure to the opening cylinder space of the second piston-cylinder unit, where the first control element is moved along with the piston of the first piston-cylinder unit; and
a second control element for controlling the application of pressure to the closing cylinder space of the first piston-cylinder unit, where the second control element is moved along with a piston of the second piston-cylinder unit;
wherein pressure is applied to the opening cylinder space of the first piston-cylinder unit by a pressure medium over the course of a first part of the opening process when opening the vacuum valve;
wherein pressure is applied to the closing cylinder space of the first piston-cylinder unit by a pressure medium over the course of a second part of the closing process when closing the vacuum valve;
wherein pressure is applied to the opening cylinder space of the second piston-cylinder unit by a pressure medium over the course of a second part of the opening process when opening the vacuum valve;
wherein pressure is applied to the closing cylinder space of the second piston-cylinder unit by a pressure medium over the course of a first part of the closing process when closing the vacuum valve;
wherein a pressure medium line for the application of pressure to the opening cylinder space of the second piston-cylinder unit is blocked during the opening of the vacuum valve over the course of the first part of the opening process, and the pressure medium line for the application of pressure to the opening cylinder space of the second piston-cylinder unit is released at the end of the first part of the opening process by the first control element; and
wherein a pressure medium line for the application of pressure to the closing cylinder space of the first piston-cylinder unit is blocked during the closing of the vacuum valve over the course of the first part of the closing process, and the pressure medium line for the application of pressure to the closing cylinder space of the first piston-cylinder unit is released by the second control element at the end of the first part of the closing process.

2. The vacuum valve according to claim 1;
wherein the closing cylinder space of the first piston-cylinder unit is connected to atmospheric pressure over the course of the first part of the opening process when opening the vacuum valve.

3. The vacuum valve according to claim 1;
wherein the closing cylinder space of the second piston-cylinder unit is connected to atmospheric pressure over the course of the second part of the opening process when opening the vacuum valve.

4. The vacuum valve according to claim 1;
wherein the opening cylinder space of the second piston-cylinder unit is connected to atmospheric pressure over the course of the first part of the closing process when closing the vacuum valve.

5. The vacuum valve according to claim 1;
wherein the opening cylinder space of the first piston-cylinder unit is connected to atmospheric pressure over the course of the second part of the closing process.

6. The vacuum valve according to claim 1;
wherein the closure member is formed by a valve plate which is pressed against a valve seat surrounding the valve orifice; and
wherein the valve plate seals the valve orifice in a closed position which the valve plate occupies in the closed state of the vacuum valve, and releases the valve orifice in an open position which the valve plate occupies in the opened state of the vacuum valve.

7. The vacuum valve according to claim 6;
wherein, in the first part of the opening process of the vacuum valve, the valve plate moves from its closed position into an intermediate position in which the valve plate is lifted from the valve seat;
wherein, in the second part of the opening process, the valve plate moves from its intermediate position into its open position;
wherein, in the first part of the closing process of the vacuum valve, the valve plate moves from its open position into its intermediate position; and
wherein, in the second part of the closing process, the valve plate moves from its intermediate position into its closed position.

8. The vacuum valve according to claim 1;
wherein the first control element prevents a connection between the opening cylinder space of the first piston-cylinder unit and the opening cylinder space of the second piston-cylinder unit during the first part of the opening process, and establishes this connection at the start of the second part of the opening process.

9. The vacuum valve according to claim 1;
wherein the second control element prevents a connection between the closing cylinder space of the second piston-cylinder unit and the closing cylinder space of the first piston-cylinder unit during the first part of the closing process, and establishes this connection at the start of the second part of the closing process.

* * * * *